United States Patent [19]
Bardon et al.

[11] Patent Number: 6,054,996
[45] Date of Patent: Apr. 25, 2000

[54] DATA PROCESSING SYSTEM AND METHOD FOR CONTROLLING A VIEW OF A REALISTIC OBJECT IN A DISPLAY DEVICE

[75] Inventors: Didier Daniel Bardon, Austin; Richard Edmond Berry, Georgetown; Denise Marie Burton, Austin; Scott Harlan Isensee, Georgetown; Shirley L. Martin; John Martin Mullaly, both of Austin, all of Tex.

[73] Assignee: Interntional Business Machines Corporation, Armonk, N.Y.

[21] Appl. No.: 08/753,082

[22] Filed: Nov. 20, 1996

[51] Int. Cl.[7] .................................................. G06F 15/00
[52] U.S. Cl. .............................................................. 345/433
[58] Field of Search ..................................... 345/333, 433, 345/334, 335

[56] References Cited

U.S. PATENT DOCUMENTS

| | | | |
|---|---|---|---|
| 4,868,765 | 9/1989 | Diefendorff | 364/521 |
| 4,899,136 | 2/1990 | Beard et al. | 340/706 |
| 4,939,507 | 7/1990 | Beard et al. | 340/706 |
| 5,060,135 | 10/1991 | Levine et al. | 364/200 |
| 5,113,517 | 5/1992 | Beard et al. | 364/200 |
| 5,261,044 | 11/1993 | Dev et al. | 395/159 |
| 5,276,785 | 1/1994 | Mackinlay et al. | 395/127 |
| 5,295,243 | 3/1994 | Robertson et al. | 395/160 |
| 5,335,323 | 8/1994 | Kolnick | 395/164 |
| 5,347,295 | 9/1994 | Agulnick et al. | 345/156 |
| 5,355,447 | 10/1994 | Knowlton | 395/139 |
| 5,375,165 | 12/1994 | Haber et al. | 379/90 |
| 5,388,202 | 2/1995 | Squires et al. | 395/157 |
| 5,455,689 | 10/1995 | Taylor et al. | 358/450 |
| 5,479,603 | 12/1995 | Stone et al. | 395/161 |
| 5,485,569 | 1/1996 | Goldman et al. | 395/159 |
| 5,487,143 | 1/1996 | Southgate | 395/157 |
| 5,491,781 | 2/1996 | Gasperina | 395/157 |
| 5,499,334 | 3/1996 | Staab | 395/157 |
| 5,517,578 | 5/1996 | Altman et al. | 382/181 |
| 5,522,025 | 5/1996 | Rosenstein | 395/158 |
| 5,524,199 | 6/1996 | Orton et al. | 395/157 |
| 5,526,478 | 6/1996 | Russell, Jr. et al. | 395/154 |
| 5,544,302 | 8/1996 | Nguyen | 395/161 |
| 5,550,967 | 8/1996 | Brewer et al. | 395/155 |
| 5,675,752 | 10/1997 | Scott et al. | 395/333 |
| 5,847,707 | 12/1998 | Hayashida | 345/348 |
| 5,892,507 | 4/1999 | Moorby et al. | 345/302 |

OTHER PUBLICATIONS

*Microsoft OS/2™ Programmer's Reference*, vol. 1, Document No. LN0702A–110–R00–0289, published by Microsoft Press, Redmond, Washington, 1989, pp. 64,71, 112, 119–120.

Burge, Thomas E. and Celi, Joseph Jr., *Advanced OS/2™ Presentation Manager Programming*, published by John Wiley & Sons, Inc., New York, New York, pp. 37–38, 1992.

*The Windows Interface, An Application Design Guide*, Document No. PC28921–0692, published by Microsoft Press, Redmond, Washington, 1992, p. 126.

Muller, Nathan, "Dial 1–800–Internet," *Byte*, Feb., 1996, pp. 83–84, 86, 88.

Wayner, Peter, "Hey Baby, Call Me at My IP Address," *Byte*, Apr., 1996, pp. 142–144.

*Object–Oriented Interface Design, IBM Common User Access™ Guidelines*, 1st Ed., published by Que Corporation, Carmel, Indiana, Dec., 1992, 43–45, 55–57, 235, 329, 342, 497, and 654.

*Primary Examiner*—Phu K. Nguyen
*Attorney, Agent, or Firm*—Winstead Sechrest & Minick P.C.; Volel Emile

[57] ABSTRACT

A data processing system, software program, and method of operation realistically displays a users model of a device as an object, while providing additional functions which cannot exist in the devices real-world counterparts. The data processing system and software program allow a view or a realistically-rendered object and a function associated with that object to be selectively modified in response to a user input. During operation, a cursor displayed by a display device (138) is used to access a view changing mechanism displayed on the realistically-rendered object. By selectively accessing the view changing mechanism, a user is able to change a view of the realistically-rendered object from a base function view to a full function view.

28 Claims, 4 Drawing Sheets

DATA PROCESSING SYSTEM AND METHOD FOR CONTROLLING A VIEW OF A REALISTIC OBJECT IN A DISPLAY DEVICE

CROSS-REFERENCE TO RELATED PATENT APPLICATIONS

The present application is related to the following applications:

Ser. No. 08/753,081, entitled "CREATING REAL-WORLD OBJECTS";

Ser. No. 08/753,077, entitled "PRIORITIZATION OF BACKGROUND DISPLAY DURING ANIMATION"; now U.S. Pat. No. 5,920,325.

Ser. No. 08/753,122, entitled "MULTIFUNCTIONAL OBJECT";

Ser. No. 08/753,076, entitled "SYSTEM AND METHOD FOR MAINTAINING SIZE AND POSITION RELATIONSHIPS FOR NON-RECTANGULAR REAL WORLD OBJECTS";

Ser. No. 08/753,124, entitled "DATA PROCESSING SYSTEM AND METHOD FOR SCALING A REALISTIC OBJECT ON A USER INTERFACE".

Ser. No. 08/753,078, entitled "DATA PROCESSING SYSTEM AND METHOD FOR VIEWING OBJECTS ON A USER INTERFACE"; now U.S. Pat. No. 5,877,763.

Ser. No. 08/753,079, entitled "DATA PROCESSING SYSTEM AND METHOD FOR PERFORMING AUTOMATIC ACTIONS IN A GRAPHICAL USER INTRFACE"; and Ser. No. 08/753,123, entitled "A DATA PROCESSING SYSTEM AND METHOD FOR MODIFYING A SIZE OF A REALISTIC OBJECT ON A USER INTERFACE";

All of the above applications are being filed on the same date as the present application and assigned to the assignee of the present application.

TECHNICAL FIELD

The present invention relates in general to data processing systems, and in particular, to object views on a user interface to a data processing system.

BACKGROUND INFORMATION

As computers have developed to provide greater capabilities at greater speeds, the ability of a user to interface with that computer has also become much simpler. For example, icons provide a pictorial representation of a function which may be executed by a computer and allow a user to easily access that function with the simple click of a mouse or a stroke of a return key. Additionally, many current software programs use realistic representations of objects to take advantage of a user's experience with the physical world. In such realistic representations, a software program for implementing a real-world application may present a realistically-rendered object which is placed directly on a desktop or other environment.

As an example, a computer may present a user with a printer object which has a realistic-looking control panel that allows the users to check a length of a queue or to change settings on the printer. Another common example of a realistic object would be a telephone which includes a keypad such as those typically implemented on real-world telephones. These realistically-rendered objects allow a user to interact with objects on a display device in a similar manner as a user interacts with physical objects to perform those operations that are common to both the physical and the virtual objects. For example, in the above-mentioned telephone application, a user would be able to dial the buttons on the telephone and pick up a handset of the virtual telephone in much the same way that the user would perform these steps with a real physical telephone.

While the use of realistically-rendered objects allows the user to easily interact with the functions performed by the computer, some tasks that are possible with a computer have no clear real-world equivalent. These tasks may include resizing and modification of the functionality of the realistically-rendered objects. As a user is not able to resize a size of their physical telephone or modify an appearance of that telephone to fit a certain need, these functions cannot be performed by a user of a real physical object. Thus, current software programs provide no effective system or method for taking advantage of a computer's capabilities without requiring a user to modify their mental model of the object and their interaction techniques.

Therefore, a need exists for a method and system which allows a user to take advantage of a computer's capabilities, even when those capabilities have no clear real-world equivalent, without breaking a uses mental model of the object or requiring a user to modify their interaction technique.

SUMMARY OF THE INVENTION

The previously mentioned needs are fulfilled with the present invention. Accordingly, there is provided, in a first form, a data processing system. The data processing system includes a display device for displaying an object which includes a view control object that has a first position and a second position. The data processing system als includes a user interface for receiving a plurality of control inputs for controlling an appearance of the object displayed by the display device and a display position of the view control object. The data processing system also includes a data processor which includes a central processing unit. The central processing unit is connected to the user interface for receiving the plurality of control inputs and is connected to the display device to provide a plurality of object control signals for selectively modifying an appearance of the object in response to the display position of the view control object.

Additionally, there is provided, in a second form, a method for operating a data processing system. The method includes the steps of displaying an object which includes a view control object on a display device, determining when a view control switch has been activated in response to an input from a user interface device, and modifying an appearance of the object on the display device when the view control switch has been activated.

As well, there is provided, in a third form, a computer program stored on a computer readable medium for executing a method for operating a data processing system. The method executes the steps of enabling a display device to display an object comprising a view control object and then determining when a view control switch has been activated in response to an input from a user interface device. The display device then modifies an appearance of the object on the display device when the view control switch has been activated.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
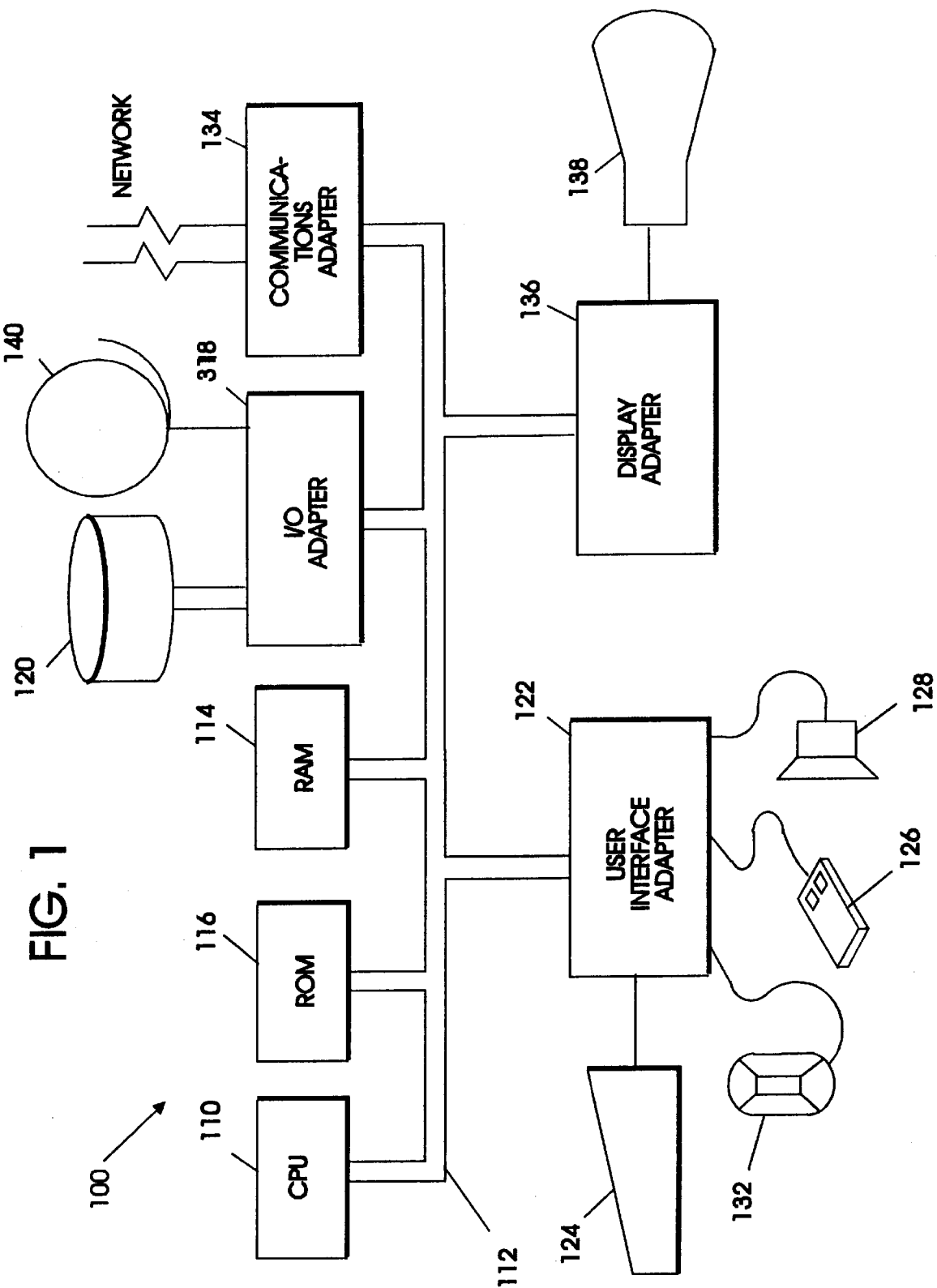
FIG. 1 illustrates, in block diagram form, a data processing system in accordance with one embodiment of the present invention.

The present invention provides a data processing system, software program, and method of operation which realistically displays a users model of a device as an object, while providing additional functions which cannot exist in the device's real-world counterpart. In the present invention, a method is implemented in the data processing system which allows a user to selectively modify a view of a realistically-rendered object and a function associated with that object in response to a user input.

To briefly describe the methodology of the present invention, the following description will be given; however, it should be noted that additional clarification will be provided in a subsequent discussion herein. During execution of the methodology of the present invention, a cursor displayed by a display device will be used to access a view changing mechanism displayed on the realistically-rendered object. Such view modification devices may include realistic representations of switches, rotary switches, dials, and other real-world objects which can be used to indicate that a view change is desired by a user.

In an embodiment of the invention described herein, a the-dimensional toggle switch is mounted to a portion of a realistically-rendered object to allow a user to modify a view of the object. A location and size of the toggle switch remains unchanged from one view to another. During operation, a user enables the switch to appear in a first position or a second position by clicking a mouse thereon, speaking a command, or hitting a key on a keyboard. By enabling the switch to be in one of the first and second positions, the user is able to change from a base function view to a full function view, and back. Thus, depending on a uses application, area on the display device may be saved by using only a base function view when a user does not require the object's additional functionality and capabilities. Conversely, a full function view of the object is also allowed when the user so requires. Thus, the toggle switch, though not strictly realistic, presents a believable "metaphor" for a function that has no counterpart in a corresponding physical object. The operation and implementation of the present invention will subsequently be described in greater detail.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

A representative hardware environment for practicing the present invention is depicted in FIG. 1, which illustrates a typical hardware configuration of a data processing system 100 in accordance with the subject invention having central processing unit (CPU) 110, such as a conventional microprocessor, and a number of other units interconnected via system bus 112. Data processing system 100 shown in FIG. 1 includes random access memory (RAM) 114, read only memory (ROM) 116, and input/output (1/0) adapter 118 for connecting peripheral devices such as disk units 120 and tape drives 140 to bus 112, user interface adapter 122 for connecting keyboard 124, mouse 126, speaker 128, microphone 132, and/or other user interface devices such as a touch screen device (not shown) to bus 112, communication adapter 134 for connecting data processing system 100 to a data processing network, and display adapter 136 for connecting bus 112 to display device 138. CPU 110 may to include other circuitry not shown herein, which will include circuitry commonly found with a microprocessor, e.g., execution unit, bus interface unit, arithmetic logic unit, etc. CPU 110 may also reside on a single integrated circuit.

The present invention implements a software program in the data processing system 100 illustrated in FIG. 1. This software program may be implemented in either ROM 116 or RAM 114 and its execution is controlled by CPU 110. By accessing the software program in either ROM 116 or RAM 114, a real-world object is displayed to the user on display device 138. In the following description of the invention, the real-world object that will be discussed is a telephone. However, it should be noted that the present invention may be expanded to apply to other real-world objects, not described in detail herein.

Figure 2:
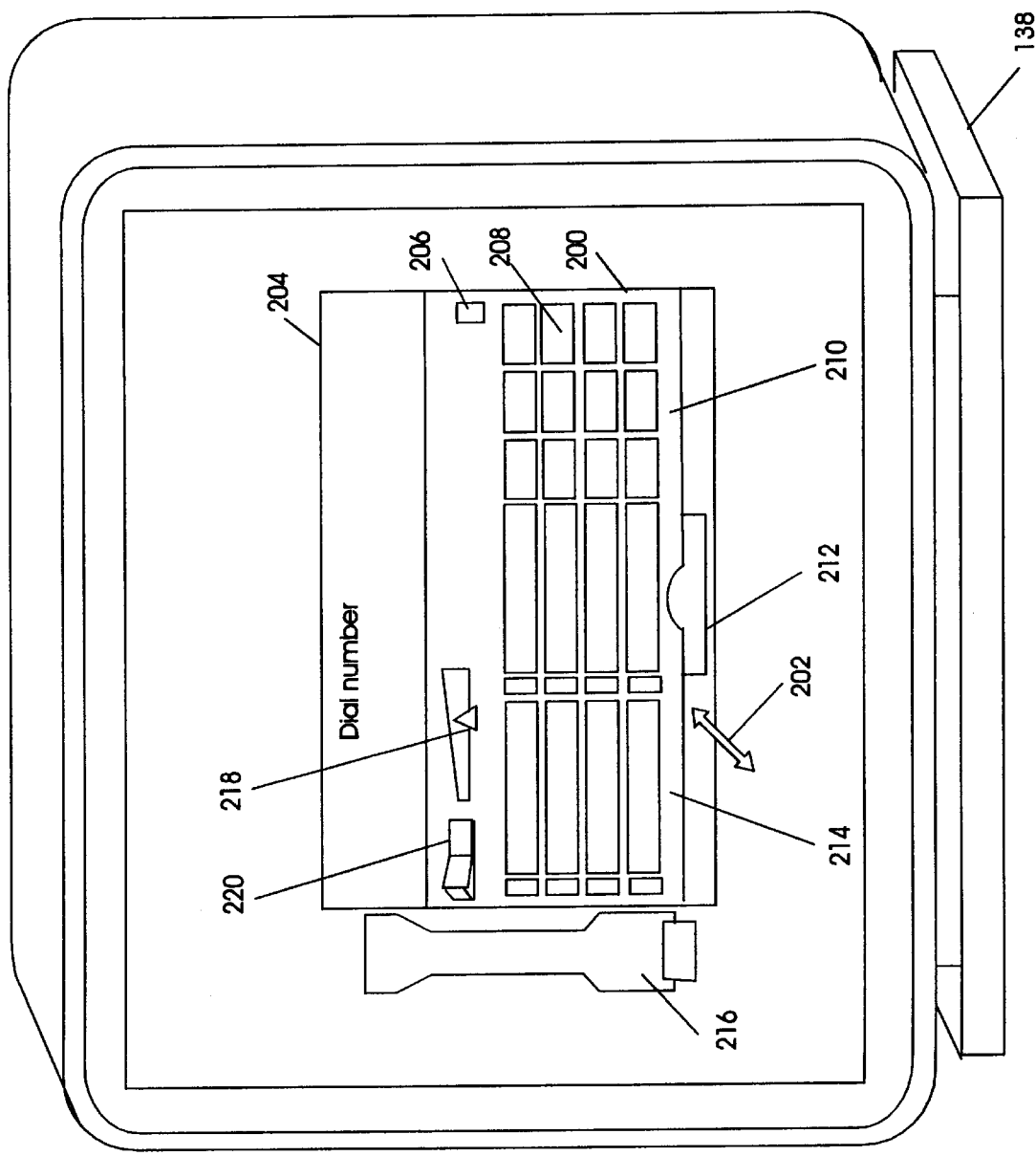
FIG. 2 illustrates, in block diagram form, a display device in accordance with one embodiment of the present invention.

Referring to FIG. 2, the realistically-rendered telephone of the present invention is illustrated as it appears on display device 138. Telephone 200 comprises a message interface 204, a help interface 206, a plurality of number selectors 208, a plurality of function selectors 210, a pull-down drawer 212, a plurality of programmable numbers 214, a handset 216, a volume controller 218, and a view selector 220. Furthermore, as illustrated on display device 138, a cursor 202 is provided.

Control of cursor 202 is provided from a user interface such as keyboard 124, mouse 126, or microphone 132. The input signals provided to one of the aforementioned user interfaces are subsequently transferred to user interface adapter 122 and processed by CPU 110 using programs stored in either of ROM 116 or RAM 114. Control of a cursor on a display device is well-known to those with skill in the data processing art and will not be described in greater detail herein.

Figure 3:
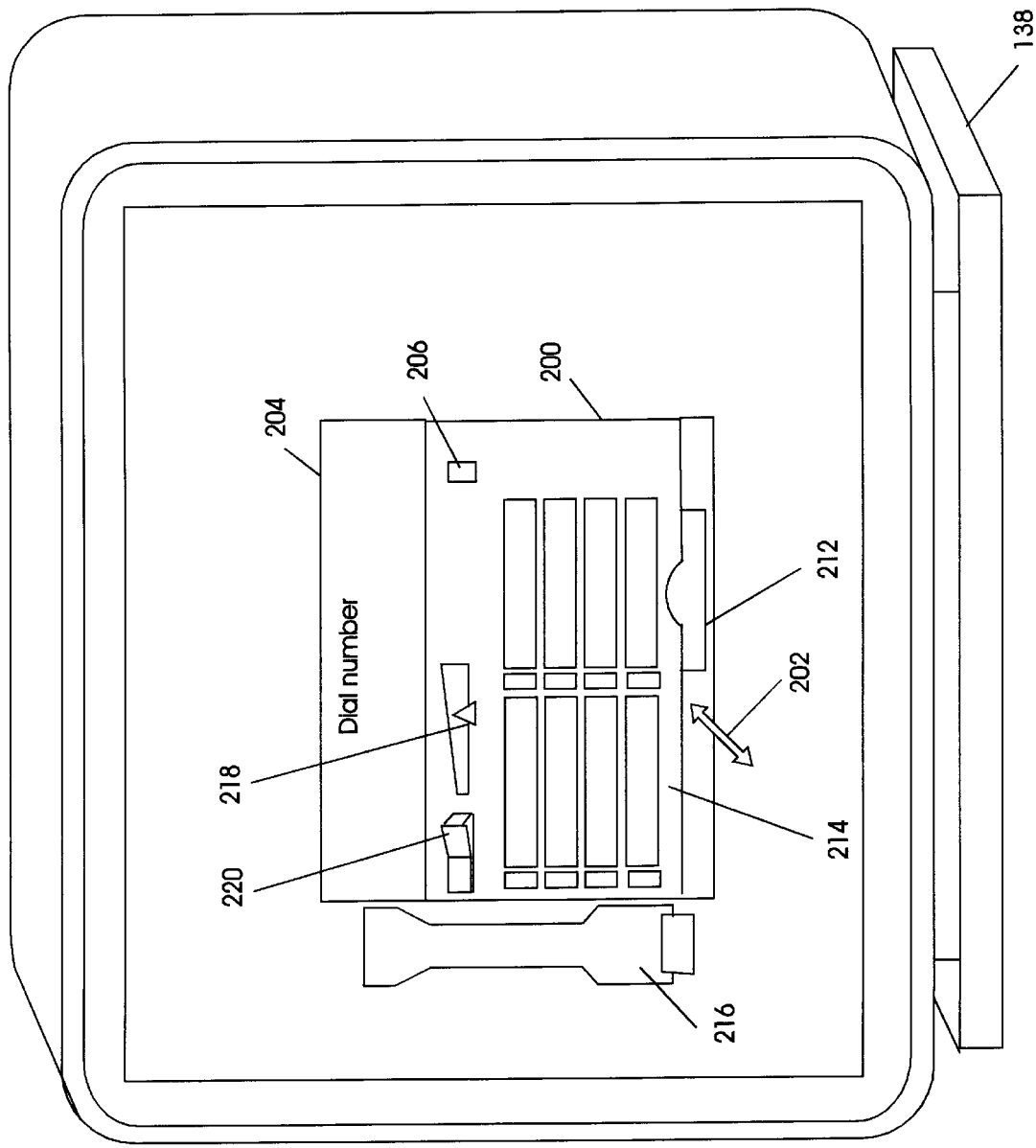
FIG. 3 illustrates, in block diagram form, a display device in accordance with one embodiment of the present invention.

To use telephone 200 of the present invention, the user is able to emulate real life actions by moving the cursor 202 to the receiver 216 and enabling it in an appropriate manner. In one embodiment of the present invention, if mouse 126 is used to control cursor 202, a user would be required to move cursor 202 to view selector 220. By selectively "clicking" on view selector 220, a user may choose between a base view and a full view of telephone 200. In one embodiment of the invention, a full view of telephone 200 is illustrated in FIG. 2 and a base view of telephone 200 is illustrated in FIG. 3. Enabling actions, such as "clicking" are well known to those with skill in the data processing art and will not be described in greater detail herein. However, it should be noted that different base and full views may also be implemented.

As illustrated in FIG. 2, when view selector 220 is in a first position, a user is able to access a telephone number from either the plurality of programmed numbers 214 or an address book which is provided in the pull-down drawer 212. Additionally, a user may dial a new number using the plurality of number selectors 208. As well, in the full view of telephone 200, a user is provided with the ability to perform other telephone functions such as redial, mute, and flash.

In contrast, when view selector 220 is in a second position to indicate that a base view of telephone 200 will be displayed, a base view of telephone 200 is selected. When view selector 220 is in the second position (FIG. 3), a user may only make a telephone call using one of the plurality of programmable numbers 214. However, while a position of view selector 220 has been modified, a manner in which view selector 220 is displayed has not been changed. Thus, view selector 220 maintains its original location relative to the plurality of programmable numbers 214 in both the base and full views of telephone 200.

While a toggle switch for performing such functions could never be implemented on a physical telephone, the use of such a selector (220) on a computer display of a realistic object allows a user to take advantage of a computer's unique ability to modify a function, as well as a view, of a realistically-rendered object in a manner which would not be available to users of a physical object. The manner in which this view is modified will be described in greater detail below.

Figure 4:
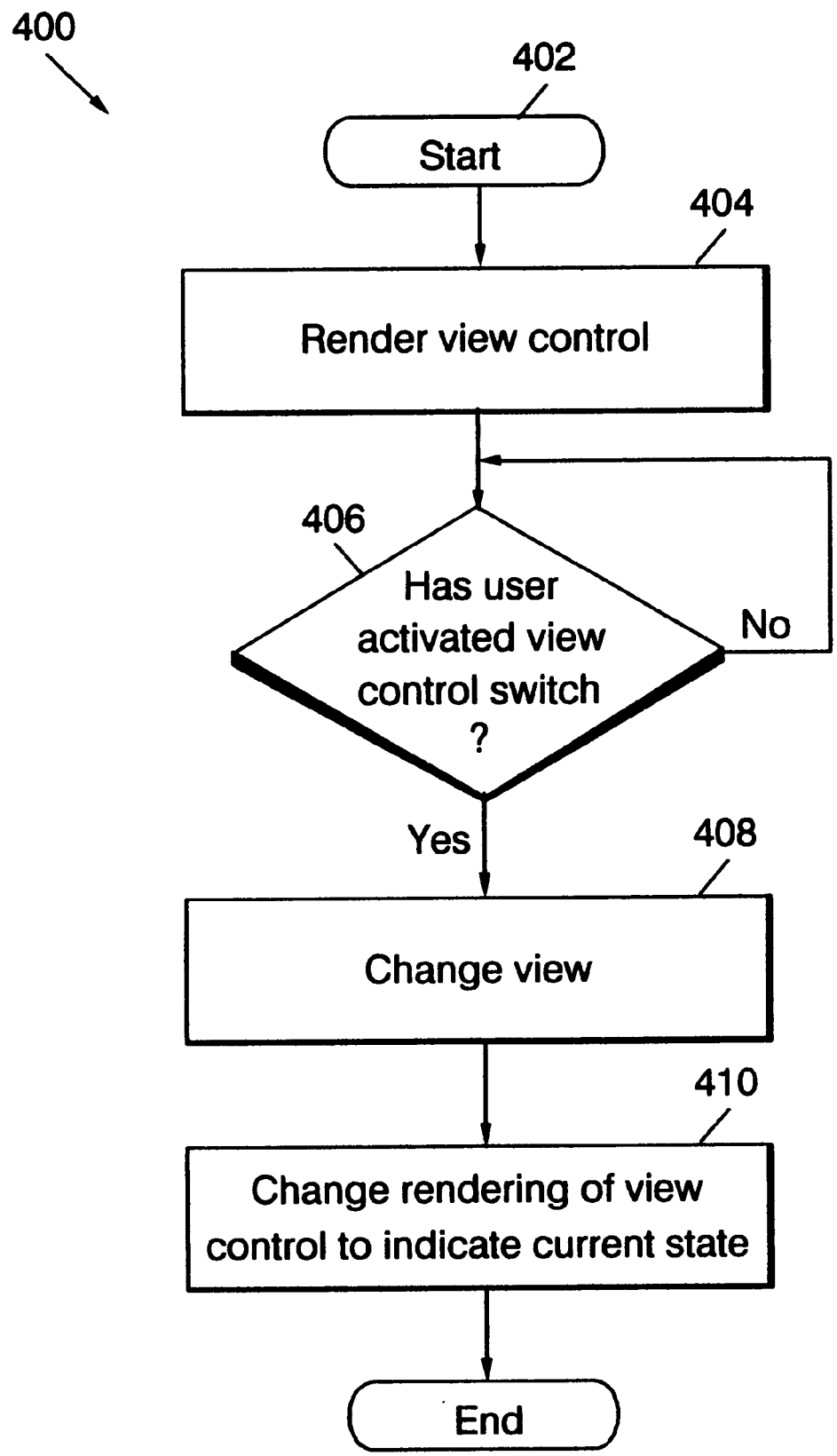
FIG. 4 illustrates in flow diagram form, a methodology for controlling a view of a realistically-rendered object in accordance with one embodiment of the present invention.

FIG. 4 illustrates a flow chart for the software which is used to selectively modify a view of the realistically-rendered object on the user display device. After the program has begun in step 402, the realistically-rendered, or container, object must be created and displayed on display device 138. Furthermore, a view control within the container object must also be created and displayed on display device 138. Subsequently, in step 406, a polling loop is initiated to check to determine whether or not a user has activated the view control switch in step 406. A user may activate the view control switch by "clicking" the mouse when the cursor is over the view control within the container object or by speaking a command for controlling the view control within the container object. Additionally, it should be understood that other methods for activating the view control switch may be implemented. Such other methods include using a key or key combination of a keyboard to toggle the view control switch.

When the user has activated the view control switch, the view displayed on display device 138 is modified accordingly in step 408. During step 408, a view change message is sent to the container object on display device 138. Subsequently, the container object resizes to the other view. In this case, the telephone either expands or constricts to illustrate the plurality of number selectors. Furthermore, when container object resizes to the other view, the container object sends a resize message to the contained objects. Contained objects are then resized and repainted. Lastly, in step 410, the view control visual image is toggled to a new view state. Modification of the view control state is performed to indicate a current state of the view control. Subsequently, user activation is again monitored. Each of the steps described above is executed by a remaining portion of data processing system 100 under control of CPU 110.

The pseudocode executed by CPU 110 to perform each of these functions is provided below. In the following psuedocode example, note that the container object is the object which includes the view controller and the contained objects are those objet depicted with the container object, including the view controller.

Pseudocode:
    Create a container object;
    Create a view control within the container object;
    Initiate polling loop to check for user activation of the view control;
    If user has activated view control:
        Send view change message to container object;
        Container object resizes to the other view;
        Container object sends resize message to contained objects;
        Contained objects resize and repaint;
        View control visual toggles to new view state;
    Return to pulling for user activation.

By providing such view controllers for real-world objects in the manner described above, the objects may be utilized in a thoroughly natural manner, with all of the flexibility and options provided by a computer system. Furthermore, the use of the methodology described herein results in a natural and intuitive control selection technique that is comfortable to current users of windowed systems, while maintaining, to some extent, the look and feel of the real-world object paradigm.

By now it should be apparent that there has been provided a data processing system and methodology for controlling a view of a realistically-rendered object on a display device. There are many additional configurations for implementing the inventions described above. For example, the view selector illustrated herein may be implemented in a form other that a toggle switch. Such forms may include a rotary switch, a slide switch, and even a latch push button. Additionally, it should be noted that the view selector may modify more than the size of the object displayed on a display device. The view selector may be used to modify the controls associated with the object and the contents of the object itself. As an example, the view selector may be used to select a visual representation of the contents of the object. Thus, by toggling or turning a switch, the contents of the object would be represented in one of a plurality of manners, including displays based on names, dates, and icons. The modification of a manner in which the contents of an object are displayed are well known to those with skill in the data processing art.

As well, while there may have been described herein the principles of the invention, it is to be clearly understood to those skilled in the art that this description is made by way of example and not as a limitation to the scope of the invention. Accordingly, it is intended, by the appended claims, to cover all modifications of the invention which fall within the true spirit and scope of the invention.

What is claimed is:

1. A data processing system, comprising:
    a display device for displaying an object which comprises a view control object, the view control object having a first position and a second position;
    a user interface for receiving a plurality of control inputs for controlling an appearance of the object displayed by the display device and a display position of the view control object; and a data processor comprising a central processing unit, wherein the central processing unit is coupled to the user interface for receiving the plurality of control inputs and coupled to the display device to provide a plurality of object control signals for selectively modifying an appearance of the object in response to the display position of the view control object.

2. The data processing system of claim 1 wherein the object is displayed in an expanded view when the display position is the first position of the view control object.

3. The data processing system of claim 2 wherein the object is displayed in a minimized view when the display position is the second position of the view control object.

4. The data processing system as recited in claim 3, wherein the view control object is also displayed in the expanded view and the minimized view.

5. The data processing system of claim 1 wherein the plurality of object control signals selectively enable the display device to display the view control object in one of the first position and the second position.

6. The data processing system of claim 1 wherein the view control object is a realistically rendered object.

7. The data processing system of claim 6 wherein the view control object is one of a toggle switch, a rotary switch, a slide switch, and a latch push-button.

8. The data processing system as recited in claim 1, wherein the view control object is displayed as a part of the object.

9. A method for operating a data processing system, comprising the steps of:

displaying an object comprising a view control switch on a display device;

determining when the view control switch has been activated in response to an input from a user interface device; and modifying an appearance of the object on the display device when the view control switch has been activated.

10. The method of claim 9, further comprising the step of:

modifying an appearance of the view control switch on the display device when the view control switch has been activated.

11. The method of claim 9 wherein the view control switch is a realistically rendered object.

12. The method of claim 9 wherein a step of modifying the appearance of the object, further comprises the steps of:

providing a view change message from a central processing unit of the data processing system;

resizing the object from a first state to a second state;

displaying a resized object on the display device;

modifying the view control switch from a third state to a fourth state; and displaying a modified view control switch on the display device.

13. The method of claim 12 wherein the first state is an expanded state and the second state is a normal state.

14. The method as recited in claim 13, wherein the view control switch is also displayed in the expanded state and the normal state.

15. The method of claim 12 wherein the first state is a normal state and the second state is an expanded state.

16. The method of claim 12 wherein a first control representation of the object is displayed when the object is in the first state and a second control representation of the object is displayed when the object is in the second state.

17. The method of claim 12 wherein the first state provides a first view of contents of the object and the second state provides a second view of contents of the object.

18. The method of claim 9 wherein the view control switch appears as one of a toggle switch, a rotary switch, a slide switch, and a latch push button on the display device.

19. The method as recited in claim 9, wherein the view control switch is displayed as a part of the object.

20. A computer program stored on a computer readable medium for executing a method for operating a data processing system, comprising the program steps of:

enabling a display device to display an object comprising a view control switch;

determining when the view control switch has been activated in response to an input from a user interface device; and enabling the display device to modify an appearance of the object on the display device when the view control switch has been activated.

21. The computer program for executing the method of claim 20, wherein a step of enabling the display device to modify the appearance of the object, further comprises the program steps of:

providing a view change message from a central processing unit of the data processing system;

resizing the object from a first state to a second state;

displaying a resized object on the display device;

modifying the view control switch from a third state to a fourth state; and displaying a modified view control switch on the display device.

22. The computer program for executing the method of claim 20 wherein the view control switch appears as a toggle switch on the display device.

23. The computer program for executing the method of claim 20, wherein a step of enabling the display device to modify the appearance of the object, further comprises the steps of:

providing a view change message from a central processing unit of the data processing system;

resizing the object from a first state to a second state;

displaying a resized object on the display device;

modifying the view control switch from a third state to a fourth state; and displaying a modified view control switch on the display device.

24. The computer program for executing the method of claim 20 wherein the first state is an expanded state and the second state is a normal state.

25. The computer program for executing the method of claim 20 wherein the first state is a normal state and the second state is an expanded state.

26. The computer program as recited in claim 25, wherein the view control switch is also displayed in the normal state and in the expanded state.

27. The method of claim 20 wherein the view control switch appears as one of a toggle switch, a rotary switch, a slide switch, and a latch push button on the display device.

28. The computer program as recited in claim 20, wherein the view control switch is displayed as a part of the object.

* * * * *